United States Patent
Tran

(10) Patent No.: US 6,886,111 B1
(45) Date of Patent: Apr. 26, 2005

(54) METHOD AND DATA PROCESSING SYSTEM FOR SOFTWARE TESTING OF A DEVICE DRIVER

(75) Inventor: Thomas Hung Tran, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/521,275

(22) Filed: Mar. 8, 2000

(51) Int. Cl.[7] .............................................. G06F 11/00
(52) U.S. Cl. .................................... 714/38; 717/124
(58) Field of Search ............................. 714/38, 35, 47, 714/37, 26, 39, 34; 717/124, 127, 128, 1–4; 709/321, 328; 710/17, 18, 263, 264

(56) References Cited

U.S. PATENT DOCUMENTS

| | | |
|---|---|---|
| 3,891,974 A | 6/1975 | Coulter et al. |
| 4,334,307 A | 6/1982 | Bourgeois et al. |
| 4,862,347 A | 8/1989 | Rudy |
| 4,920,481 A | 4/1990 | Binkley et al. |
| 5,278,973 A | 1/1994 | Obrien et al. |
| 5,440,697 A | 8/1995 | Boegel et al. |
| 5,603,014 A | 2/1997 | Woodring et al. |
| 5,630,049 A * | 5/1997 | Cardoza et al. ............... 714/25 |
| 5,630,052 A | 5/1997 | Shah |
| 5,664,195 A * | 9/1997 | Chatterji ..................... 717/124 |
| 5,717,903 A | 2/1998 | Bonola ....................... 395/500 |
| 5,721,876 A | 2/1998 | Yu et al. |
| 5,796,984 A | 8/1998 | Pearce et al. |
| 5,832,299 A | 11/1998 | Wooten |
| 5,867,710 A * | 2/1999 | Dorris et al. ............... 717/124 |
| 5,918,048 A | 6/1999 | Mealey et al. |
| 5,933,631 A | 8/1999 | Mealey et al. |
| 5,953,516 A | 9/1999 | Bonola |
| 5,978,584 A * | 11/1999 | Nishibata et al. ........... 717/134 |
| 6,047,124 A * | 4/2000 | Marsland ..................... 717/128 |
| 6,047,392 A * | 4/2000 | Liddell et al. ................. 714/49 |
| 6,279,122 B1 * | 8/2001 | Hitchcock et al. ............ 714/33 |
| 6,279,124 B1 * | 8/2001 | Brouwer et al. .............. 714/38 |

* cited by examiner

Primary Examiner—Nadeem Iqbal
(74) Attorney, Agent, or Firm—Roy W. Truelson

(57) ABSTRACT

A system and method are disclosed for testing a device driver on a data processing system. An operating system allocates a memory address range for executing a device driver. The device driver is executed as an application on top of the operating system to test the device driver. The system and method monitor to detect whether a target address for a request made by the device driver is within the memory address range. In response to detecting the target address for the request being made outside of the memory address range, the target address is trapped, and a data exception handler is executed to emulate a target device.

26 Claims, 5 Drawing Sheets

METHOD AND DATA PROCESSING SYSTEM FOR SOFTWARE TESTING OF A DEVICE DRIVER

BACKGROUND OF THE INVENTION

1. Technical Field

The present invention relates in general to device drivers and software emulation of hardware devices, and, in particular, to a method and data processing system for testing a device driver entirely in software. Still more particularly, the present invention relates to a method and system for testing a device driver that invoke an exception handler to map a target address range to a data space range of the operating system and to emulate a target hardware device if the target address range is outside of the data space range.

2. Description of the Related Art

With reference now to the figures and in particular with reference to FIG. 1, there is illustrated a software layer diagram 100 that shows a device driver 108 in relationship to an application program 102, operating system 104, and firmware 106 of a data processing system. Firmware 106 is generally the layer interposed between hardware, such as target device 110, and operating system 104 and interacts with the hardware to perform designated tasks. Application program 102, in contrast, runs on top of operating system 104 and frequently uses abstract constructs to perform its operations. Application program 102 often relies upon firmware 106 to accomplish the pragmatic task of controlling the data processing system hardware. When application program 102 is executed, application program 102 calls on firmware 106. Firmware 106, in turn, maps commands of application program 102 to the respective hardware.

FIG. 1 shows that device driver 108 is typically part of firmware 106. Device drivers 108 are well known in the art. The development of device driver 108 is straightforward if target device 110 actually exists during or before the time device driver 108 is being developed. Device driver 108 is tested by installing device driver 108 into a data processing system, coupling target device 110 to a data processing system, and running application program 102 under an operating system 104 that requests access to and operation of target device 110. If access to and operation of target device 110 is successful, then device driver 108 has been successfully tested. However, if target device 110 does not exist during or before development of device driver 108, testing of device driver 108 requires simulation of hardware target device 110.

Since a device driver is generally a routine used by an application program 102 to drive hardware target device 110, a conventional device driver usually involves mapping between two sets of commands, a software command set for application program 102 and a hardware command set for target device 110. The software command set generally includes commands for the software, such as Aload@ and Astore@ commands. The hardware command set generally comprises commands for the hardware, such as Ainport@ and Aoutport@ commands. Also, software commands generally translate over to respective hardware commands. For example, the Aload@ and Astore@ commands for a software program respectively correlate to the Ainport@ and Aoutport@ commands for a hardware device. A memory mapped input/output (IO) architecture has been developed to simplify the command set for a device driver (i.e., simplify the two command sets into one command set). The trend has been to simplify and use memory mapped IO device drivers rather than the conventional device drivers that directly interact with hardware devices.

Memory mapped 10 generally involves allocating an address range to one or more IO devices in a data processing system. The address range maps accesses to physical hardware addresses to the allocated address range so that hardware commands are treated as software commands, which are usable by a software or firmware program, such as a device driver. Through use of the memory mapped IO, a software or firmware program, such as a device driver, is able to communicate with the hardware device as though the program were communicating directly with memory.

The use of a software emulator for emulating a target device 110 is known in the prior art. U.S. Pat. No. 5,796,984 to Pearce et al. (APearce@) discloses an example of a software emulator of a peripheral hardware device. The software emulator may be used for testing a device driver based on various reasons, such as hardware costs, hardware availability, etc. A conventional way of testing a device driver with a software emulator typically involves using an input/output (IO) interrupt handler. The IO interrupt handler involves taking an exception when an access by the device driver is made to the physical hardware device 110 (i.e., a hardware command is executed by the device driver). Control and access by the device driver is, in effect, re-directed to the software emulator, and the software emulator emulates the behavior of the hardware device 110. Pearce provides an example of using an IO interrupt handler for testing a device driver. Since memory mapped IO device drivers do not attempt direct access and control of hardware device 110 (i.e., do not execute hardware commands), then use of an IO interrupt handler to test a memory mapped device driver would not work.

Without the use of an interrupt or exception handler, re-directing of the accesses by a memory mapped device driver (i.e., re-directing software commands, such as load and store commands) cannot be accomplished. When the memory mapped 10 device driver performs such accesses (i.e., executes software commands), the memory mapped IO device driver, having not been re-directed, may seek to access memory addresses outside the data address space defined by operating system 104 with which the device driver is being executed. Attempts to read from or write to these memory addresses could have potentially disastrous consequences and would therefore be prohibited by operating system 104. Thus, the memory addresses will have a completely different context when device driver 108 is executed with the operating system 104. One possible solution to this problem is to manually modify the code to change all of the addresses so that the addresses are mapped to addresses within the data address space of operating system 104. However, the modification of code and all addresses within the code would be an extremely tedious and time-consuming process and would require the changing of a significantly large number of lines of code. Therefore, testing of a memory mapped IO device driver is presently impossible or very impractical.

SUMMARY OF THE INVENTION

A system and method are disclosed for testing a device driver on a data processing system. An operating system allocates a memory address range for executing a device driver. The device driver is executed as an application on top of the operating system to test the device driver. The system and method monitor to detect whether a target address for a request made by the device driver is within the memory address range. In response to detecting the target address for the request being made outside of the memory address range, the target address is trapped, and a data exception handler is executed to emulate a target device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

A method and system are disclosed for testing a device driver that invoke a data exception handler to simulate the operation of a target device. The data exception handler emulates the target hardware device if a memory request address is outside of an allocated data space range.

Figure 2:
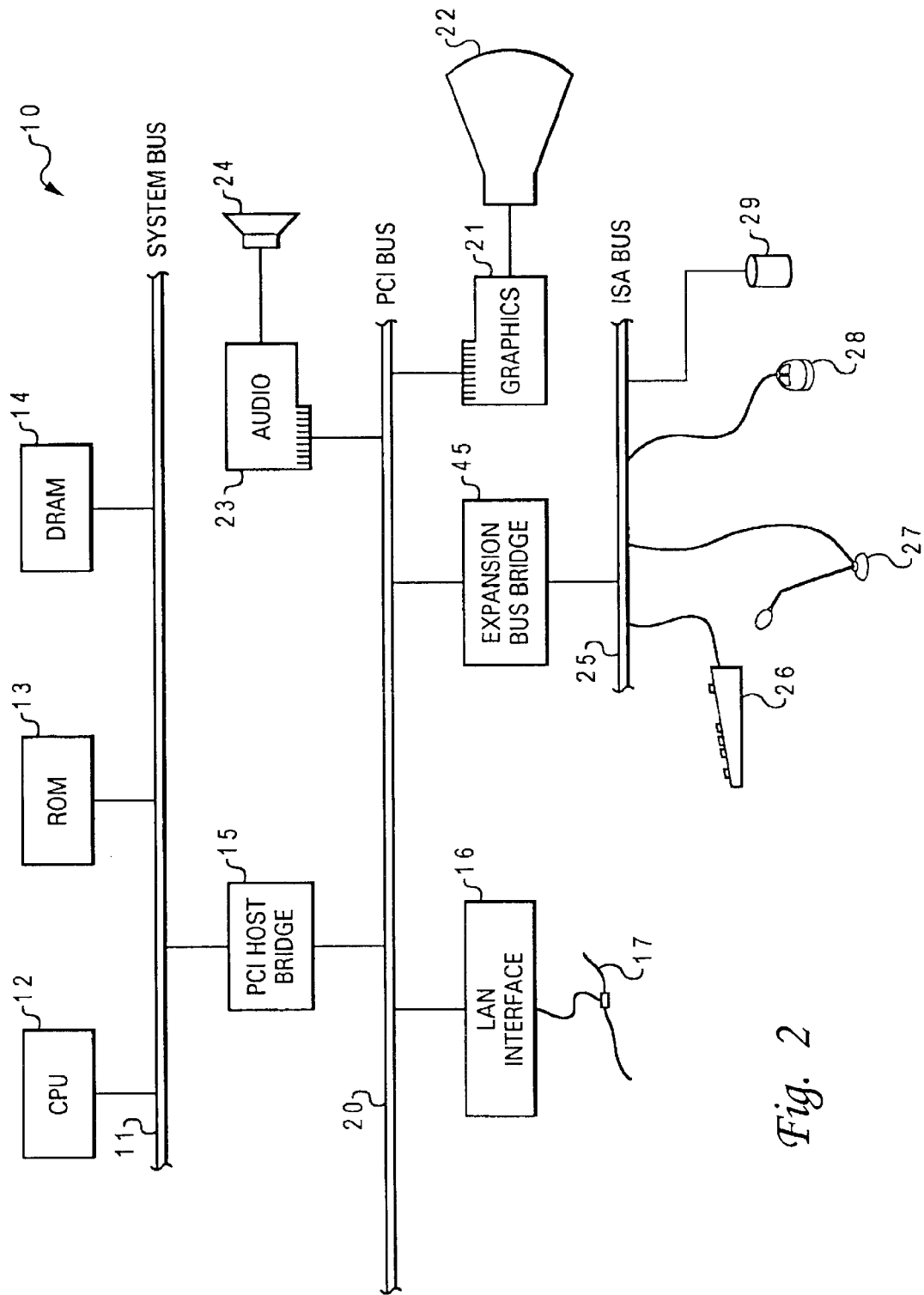
FIG. 2 is a block diagram of an exemplary data processing hardware system for implementing the system and method of the present invention.

With reference now to FIG. 2, there is shown an overall exemplary block diagram of a data processing system 10 for implementing the present invention. As shown, a central processing unit (CPU) 12, read only memory (ROM) 13, and a Dynamic Random Access Memory (DRAM) 14 are connected to a system bus 11 of computer system 10. CPU 12, ROM 13, and DRAM 14 are also coupled to a PCI local bus 20 of computer system 10 through a PCI host bridge 15. PCI host bridge 15 provides a low latency path through which processor 12 may directly access PCI devices mapped anywhere within bus memory and/or I/O address spaces. PCI host bridge 15 also provides a high bandwidth path allowing PCI devices to directly access DRAM 14. In addition, an audio adapter 23 may be attached to PCI local bus 20 for controlling audio output through speaker 24. A graphics adapter 21 may be attached to PCI local bus 20 for controlling visual output through display monitor 22. Also attached to PCI local bus 20 is a local-area-network (LAN) interface adapter 16. LAN interface adapter 16 is for connecting computer system 10 to a local-area network (LAN) 17. A PCI-to-ISA bus bridge, such as an expansion bus bridge 45, may be utilized for coupling an ISA bus 25 to PCI local bus 20. As shown, a keyboard 26, a microphone 27, a mouse 28, and a hard disk driver 29 may be attached to ISA bus 25 for performing certain basic I/O functions. Although the illustrated exemplary embodiment describes a PCI local bus 20 and an ISA bus 25, the present invention is not limited to these particular bus architectures. Rather, the present invention can be utilized in any bus system having other different bus architectures.

Figure 1:
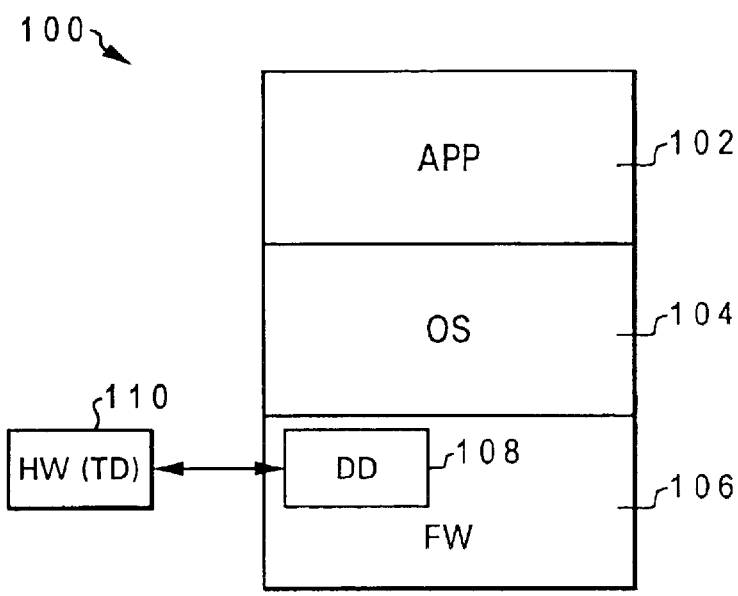
FIG. 1 is a general software layer diagram in accordance to the prior art illustrating a conventional device driver in relationship to the applications, operating system, firmware, and hardware target device.
Figure 3:
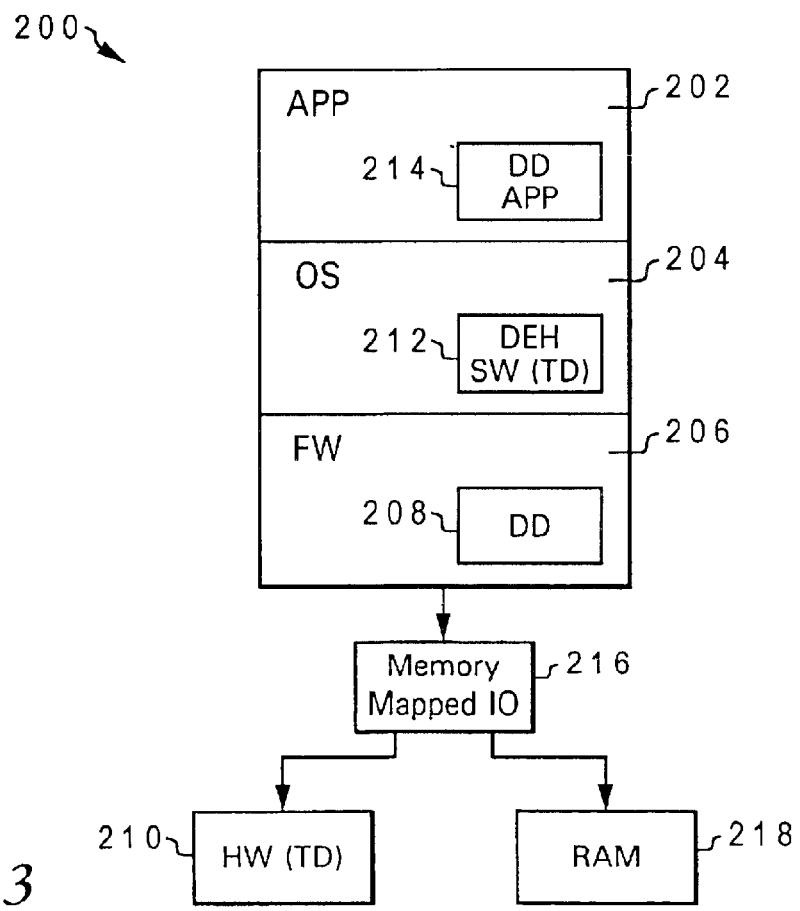
FIG. 3 is a software layer diagram in accordance to the present invention illustrating the device driver as an application in relationship to the applications, operating system, firmware, and hardware devices.

Referring now to FIG. 3, a software layer diagram 200 for illustrating the general topology of the present invention is shown. Software layer diagram 200 shows device driver 208 as an application 214 and further shows application 214 in relationship to application layer 202, operating system layer 204, firmware layer 206, hardware target device 210, memory mapped IO 216, and random access memory (RAM) device 218, which may be DRAM 14 of FIG. 2. Device driver 208 is shown at firmware layer 206. Typically, an application program at application layer 202 may issue a request targeting hardware target device 210. Operating system at operating system layer 204 handles the application requests. When the request is issued, the operating system directs device driver 208 to execute and communicate with RAM 218 as though device driver 208 were communicating directly to hardware target device 210. RAM device 218 is mapped to hardware target device 210 via memory mapped input/output (IO) 216.

However, in the present invention, device driver 208 is run as application 214 to test device driver 208. If hardware target device 210 exists, then hardware target device 210 is used for testing device driver application 214. Application 214 is executed on top of the operating system at operating system layer 204. When, during execution of application 214, a request targeting hardware device 210 is issued, the operating system at layer 204 handles the request to access hardware target device 210 via memory mapped IO 216. Memory mapped IO 216 maps an address in RAM 218 that represents hardware target device 210 to the corresponding physical address for hardware target device 210. On the other hand, if hardware target device 210 does not exist, then any request targeting hardware device 210 via memory mapped 216 during execution of application 214 is to be re-routed by the operating system to a software emulator of target device 210. In this case, a data exception is taken by the operating system at layer 204 when the request targeting hardware target device 210 through memory mapped IO 216 is issued, and the operating system re-routes the request to data exception handler 212. Data exception handler 212, which is shown at operating system layer 204, handles the request. After the data exception is taken and the request is re-routed to data exception handler 212, data exception handler 212 emulates the behavior of hardware target device 210. The present invention may be used with any suitable operating system 204, such as AIX, Windows NT, LINUX, UNIX, etc.

Figures 4, 6:
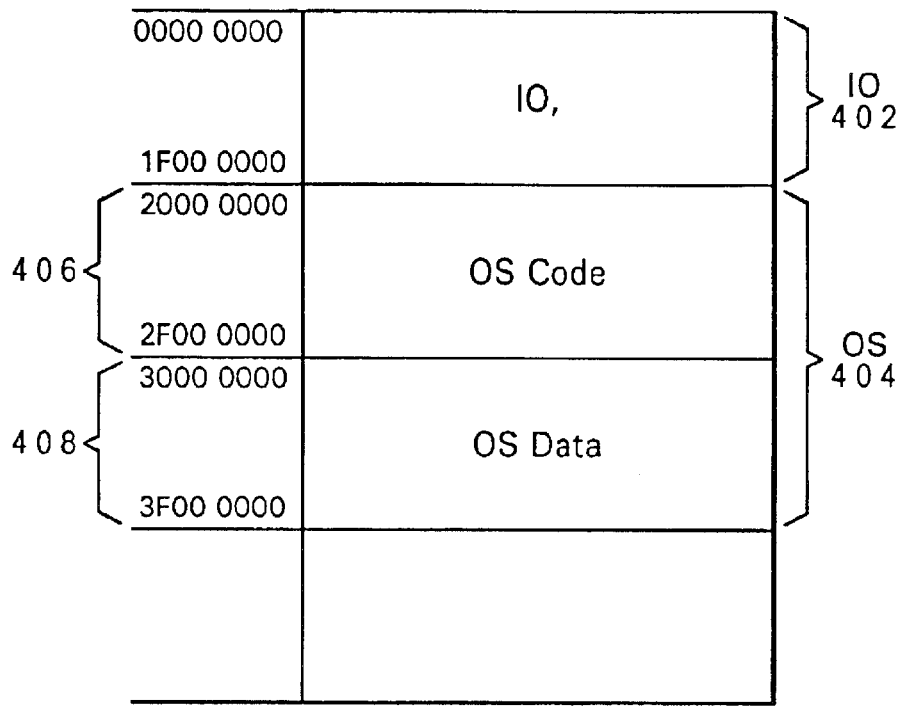
FIG. 4 is a block diagram that illustrates a typical memory map.
FIG. 6 is a block diagram illustrating more specific method steps for setting up an operating system.

With reference now to FIG. 4, a block diagram that illustrates a typical memory map 400 is shown. Memory map 400 is shown to have an input/output (IO) space 402 and a typical program process space 404 for the operating system (such as AIX, Windows NT, LINUX, UNIX, etc.). Data stored in IO space 402 generally map memory mapped addresses (i.e., RAM addresses) to physical hardware locations. The operating system allocates program process space 404 as a memory address range for executing applications, including application 214. Program process space 404 comprises code space 406, which contain the instructions for various applications or programs. As shown, code space 406 in memory map 400 is defined as the range of addresses between A2000 0000@ and A2F00 0000@. Memory map 400 also comprises data space 408, which contain the data for various applications or programs. Data space 408 is defined as the range of addresses between A3000 0000@ and A3F00 0000@.

Without memory map 400, application 214 would issue a request for a data memory address (i.e., 1F00 0000) that is at a physical hardware location, and operating system 204 would terminate application 214 since the address is outside data space 408 (i.e., A30000 0000 and 3F00 0000"). However, with the use of memory map 400, the request is able to be directed to the location of physical hardware target device 210 by using memory mapping IO data in IO space 402. However, if such hardware target device 210 does not exist, then an exception needs to be taken by the operating system to re-direct the request to a software emulator of target device 210. The present invention provides a memory mapped IO exception handler (i.e., a data exception handler) that is invoked to handle the request and acts as the software emulator to emulate target device 210. The present invention operates on the premise that requests for a hardware target device 210 are only for addresses that are outside of data space 408. A determination is made as to whether requests for a hardware target device 210 by application 214 are for addresses outside of data space 408. The requests for addresses outside of the data space 408 are then re-routed to the memory mapped IO exception handler (i.e., the data exception handler). The memory mapped 10 exception handler handles the requests and emulates the behavior of hardware target device 210.

Figure 5:
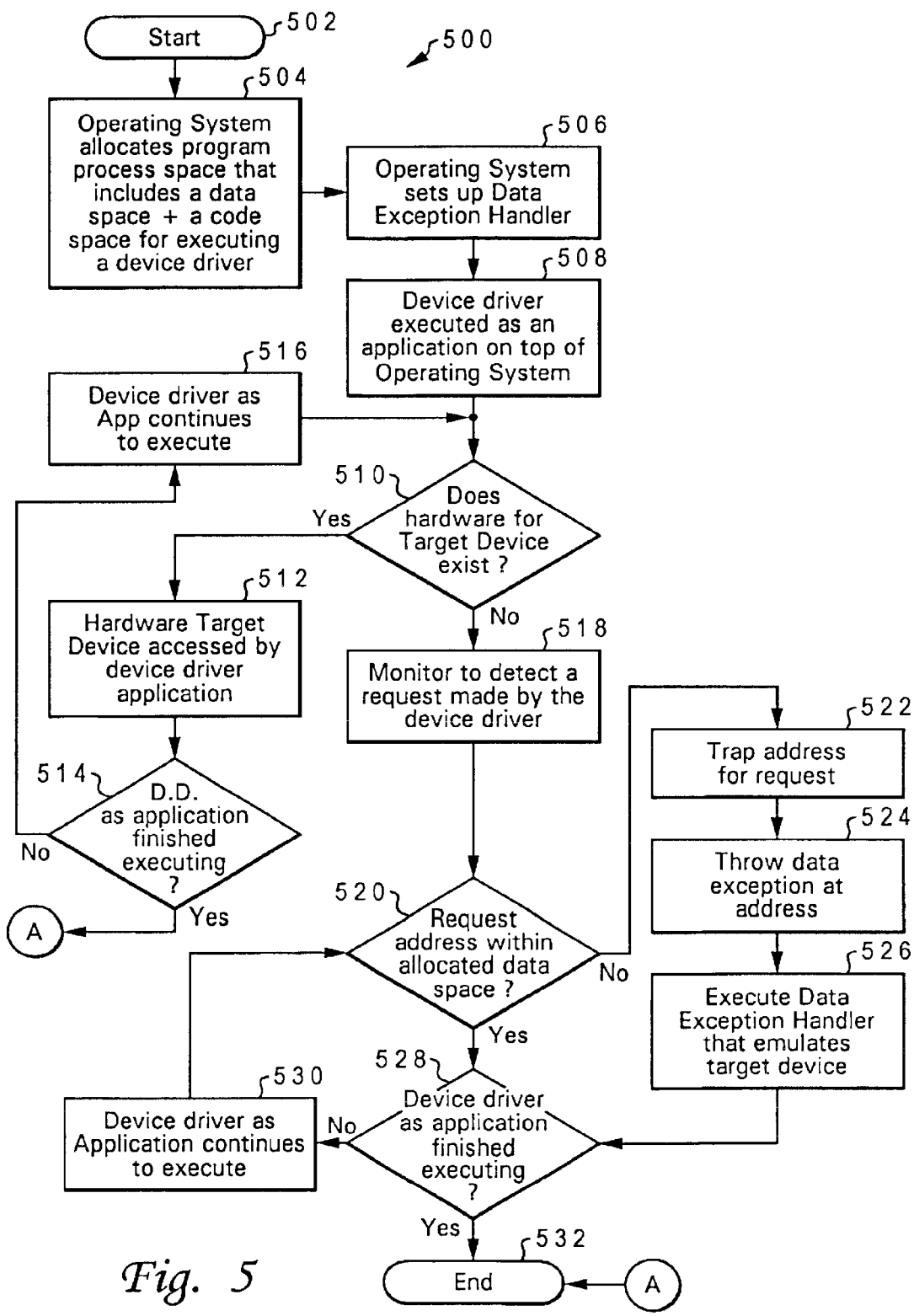
FIG. 5 is a flow chart of an exemplary method for implementing the present invention.
Figure 7:
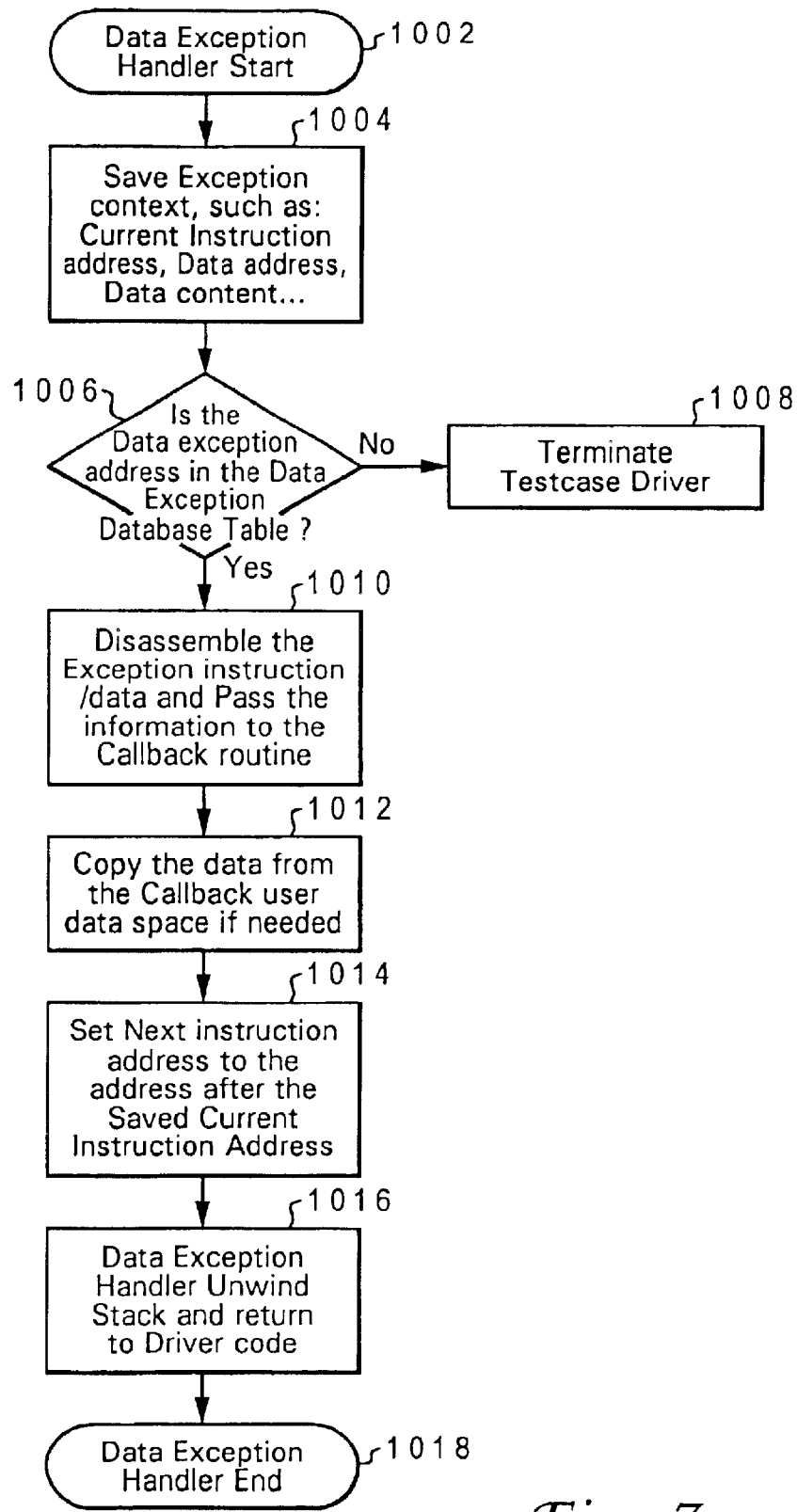
FIG. 7 is a flow chart of an exemplary data exception handler for implementing the present invention.

With reference now to FIGS. 5, 6, and 7, implementation of the method for testing a device driver that invokes a data exception handler to simulate operation of the target device is shown. The present invention provides a data exception handler that is invoked when a request by application 214 attempts to access to a memory mapped IO address.

In FIG. 5, method 500 for implementing the present invention starts at block 502. Method 500 moves to block 504 in which operating system 204 allocates a program process space 404, that includes code space 406 and data space 408, for executing memory mapped input/output (IO) device driver 208 as application 214. Method 500 moves to block 506, which depicts operating system 204 setting up the data exception handler that is executed and used by operating system 204 when a data exception is taken. FIG. 6 shows that the set up block 506 of FIG. 5 for the data exception handler further comprises more detailed steps in blocks 602 and 604. Block 602 calls operating system 204 to install a data exception handler facility containing the data exception handler into a vector of an interrupt table for operating system 204. The data exception handler comprises a parser that has a disassembler, which is used for disassembling and identifying an assembler instruction of the request. Depending on the request, the assembler instruction may be a load/read command, a store/write command, or any other type of instruction. Allocated data space 408 is passed by the data exception handler facility to the vector of the interrupt table for operating system 204. Block 604 shows that the data exception handler facility is called to register data that is used to determine when a data exception is to be taken (i.e., such as when a target address is requested in which the target address is outside of data space 408). The data include, for example, each of the various target addresses at which a data exception is to be taken, lengths of the target addresses, and user callback routines for the data exception handler calling back to application 214. User callback routines also emulate assembler instructions based on requests by application 214 for device driver 208. The data is stored into a data exception database table.

With reference back to FIG. 5, method 500 continues at block 508 in which device driver application 214 is executed on top of operating system 204. Method 500 then moves to decision block 510 in which a determination is made as to whether hardware target device 210 is coupled to data processing system 10. If it is determined that hardware target device 210 is coupled to data processing system 10 at decision block 510, method 500 moves to block 512, which depicts hardware target device 210 being accessed and used by application 214. Method 500 then moves to decision block 514, which represents a determination being made as to whether device driver application 214 is finished executing. If application 214 is finished executing at decision block 514, then method 500 ends at block 532 via connector A.

However, if application 214 has not finished executing at decision block 514, then method 500 moves to block 516, which depicts device driver application 214 continuing to execute with use and access of hardware target device 210, and method 500 returns to decision block 510 and continues therefrom. On the other hand, if it is determined at decision block 510 that hardware target device 210 does not exist, method 500 moves to block 518, which depicts operating system monitoring to detect a request issued by application 214. Method 500 moves to decision block 520, which depicts a determination being made as to whether a target address specified by the request is within data space 408. If the target address is not with data space 408, method 500 moves to block 522, which represents the target address for the request being trapped, and to block 524, which represents a data exception being taken. Method 500 then moves to block 526, which shows the data exception handler intercepting the request and being executed to handle the data exception. The data exception handler emulates hardware target device 210. Method 500 then continues onto decision block 528.

If the determination is made at decision block 520 that the target address is within data space 408, method 500 then continues onto decision block 528. At decision block 528, a determination is made as to whether device driver application 214 has finished executing. If application 214 has not finished executing at decision block 528, then method 500 moves to block 530, which shows device driver application 214 continuing to execute, and method 500 returns to decision block 520 to continue therefrom. However, if application 214 has finished executing at decision block 528, then method 500 ends at block 532.

FIG. 7 shows an exemplary data exception handler 1000. Data exception handler 1000 starts at block 1002. Data exception handler 1000 moves to block 1004, which represents exception context data being saved into a memory stack for the request. The data include, for example, the target address for the request, content data relating to the request, and a data address range for the content data. Data exception handler 1000 moves to decision block 1006, which shows a determination being made by data exception handler 1000 as to whether the target address, which is a memory mapped IO address or data exception address saved into the memory stack, is an address stored in the data exception database table. If the determination is made at decision block 1006 that the target address is not stored in the data exception database table, then method 500 of FIG. 5 for testing device driver 208 is immediately terminated at block 1008. In this situation, method 500 is terminated since device driver application 214 is attempting to access an address that is entirely outside of the accessible address range for device driver 208. Otherwise, data exception handler 1000 continues onto block 1010. At block 1010, data exception handler 1000 disassembles the data for the request into information for a respective user callback routine stored in the data exception database table. The user callback routine that is used is selected on the basis of the request. Data exception handler 1000 passes the disassembled information to the respective user callback routine. The respective user callback routine also emulates a behavior of hardware target device 210. Data exception handler 1000 then moves to block 1012, which shows the content data being copied, as necessary, by the user callback routine from a data space for the callback routine based on the assembler instruction for the request. For example, the copying of the content data is performed when the assembler instruction is a load or read command in order for data exception handler 1000 to emulate the load or read command. Data exception handler 1000 moves onto block 1014, which depicts a next instruction address being set to an address in the memory stack after the currently saved target address. Data exception handler 1000 then moves onto block 1016, which shows data exception handler 1000 unwinding the memory stack to return control back to application 214. Data exception handler 1000 ends at block 1018.

For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data: processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

While the invention has been particularly shown and described with reference to a preferred embodiment, it will be understood by those skilled in the art that various changes in form and detail may be made therein without departing from the spirit and scope of the invention.

What is claimed is:

1. A method of testing a device driver on a data processing system, said method comprising:
   allocating, by an operating system, a data space for executing a device driver;
   setting up, by the operating system, a data exception handler that emulates a target device;
   executing the device driver as an application on top of the operating system to test the device driver;
   monitoring to detect whether a request made by the device driver specifies a target address within the data space; and
   in response to detecting the target address for the request being made outside of the data space, trapping on the target address for the request and executing said data exception handler that emulates a target device;
   wherein the setting up step further comprises:
   (a) calling the operating system to install a data exception handler facility containing the data exception handler into a vector of an interrupt table for the operating system; and
   (b) calling the data exception handler facility to register data that is used to determine when the data exception is to be taken in a data exception database table.

2. A method of testing a device driver on a data processing system, said method comprising:
   allocating, by an operating system, a data space for executing a device driver;
   setting up, by the operating system, a data exception handler that emulates a target device;
   executing the device driver as an application on top of the operating system to test the device driver;
   monitoring to detect whether a request made by the device driver specifies a target address within the data space; and
   in response to detecting the target address for the request being made outside of the data space, trapping on the target address for the request and executing said data exception handler that emulates a target device
   wherein the setting up step further comprises:
   (a) calling the operating system to install a data exception handler facility containing the data exception handler into a vector of an interrupt table for the operating system; and
   (b) calling the data exception handler facility to register data that is used to determine when the data exception is to be taken wherein the data include each of various target addresses at which the data exception is to be taken, lengths of the target addresses, and user callback routines for calling back to the application into a data exception database table.

3. The method according to claim 2, further comprising:
   passing, by the data exception handler facility, the data space to the vector of the interrupt table.

4. The method according to claim 3, wherein the data exception handler is a memory mapped input/output (IO) exception handler comprising a parser with a disassembler that is used for disassembling and identifying an assembler instruction of the request.

5. The method according to claim 4, wherein the assembler instruction is identified as a load command.

6. The method according to claim 4, wherein the assembler instruction is identified as a store command.

7. The method according to claim 2, wherein the data exception handler further comprises:
   saving, into a memory stack, data for the request which includes at least the target address for the request, content data relating to the request, and a data address range for the content data;
   determining whether the target address that is saved into the memory stack is within the database exception database table;
   immediately terminating the method of testing if the target address is not within the database exception database table;
   disassembling the data for the request into disassembled information and passing the disassembled information into a respective one of the user callback routines stored in the data exception database table wherein the respective one of the user callback routines that is used is based on the request and is for emulating a behavior of the target device;
   emulating, by the respective one of the user callback routines, the behavior of the target device;
   setting a next instruction address to an address in the memory stack that is after the currently saved target address; and unwinding the memory stack by the data exception handler to return control back to the application.

8. The method according to claim 7, further comprising:

copying, as necessary, the content data by the respective one of the user callback routines from another data space for the respective one of the user callback routines based on the request.

9. The method according to claim 1, wherein the data exception handler is a software emulator of the target device and further comprises:

using a hardware emulator to test the application for the device driver if the hardware emulator is coupled to the data processing system; and using the software emulator to test the application for the device driver if the hardware emulator is not coupled to the data processing system.

10. The method according to claim 1, further comprises:

determining whether the application for the device driver has finished executing;

continuing with the executing of the application if the application has not finished executing; and terminating the method of testing when the application has finished executing.

11. A data processing system for testing a device driver, said data processing system comprising:

a processor and a memory system, wherein:

said processor executes an operating system that allocates a data space for executing applications and executes a device driver as an application on top of the operating system to test the device driver;

said processor and said memory system, responsive to detecting a request by the device driver specifying a target address outside of the data space, trap on the target address and execute a data exception handler that emulates a target device of the device driver; and said processor and said memory system call a data exception handler facility to register data that is used to determine when a data exception is to be taken, wherein the data include each of various target addresses at which the data exception is to be taken, lengths of the target addresses, and user callback routines for calling back to the application into a data exception database table.

12. The system according to claim 11, wherein said processor and said memory system call the operating system to install the data exception handler facility containing the data exception handler into a vector of an interrupt table for the operating system.

13. The system according to claim 12, wherein the data exception handler facility passes the data space to the vector of the interrupt table.

14. The system according to claim 13, wherein the data exception handler is a memory mapped input/output (IO) exception handler that is stored in the memory system and comprises a parser with a disassembler that is used for disassembling and identifying an assembler instruction of the request.

15. The system according to claim 14, wherein the assembler instruction is a load command.

16. The system according to claim 14, wherein the assembler instruction is a store command.

17. The system according to claim 12, wherein the data exception handler determines whether the target address is within the data exception database table and, responsive to said determination, immediately terminates testing of the device driver if the target address is not within the data exception database table, and, emulates, by the respective one of the user callback routines, the behavior of the target device if the target address is within the data exception database table.

18. The system according to claim 17, wherein the data exception handler further:

copies, as necessary, the content data by the respective one of the user callback routines from another data space for the respective one of the user callback routines based on the request.

19. The system according to claim 11, wherein the data exception handler is a software emulator of the target device and wherein:

a hardware emulator is used to test the application for the device driver if the hardware emulator is coupled to the data processing system; and the software emulator is used to test the application for the device driver if the hardware emulator is not coupled to the data processing system.

20. A program product for testing a device driver on a data processing system comprising:

instruction means for allocating, by an operating system, a data space for executing a device driver;

instruction means for setting up, by the operating system, a data exception handler that emulates a target device;

instruction means for executing the device driver as an application on top of the operating system to test the device driver;

instruction means for monitoring to detect whether a request made by the device driver specifies a target address within the data space;

in response to detecting the target address for the request being made outside of the data space, instruction means for trapping on the target address for the request and executing said data exception handler that emulates a target device; and computer usable media bearing said instruction means;

wherein the instruction means for setting up further comprises:
(a) instruction means for calling the operating system to install a data exception handler facility containing the data exception handler into a vector of an interrupt table for the operating system; and
(b) instruction means for calling the data exception handler facility to register data that is used to determine when the data exception is to be taken wherein the data include each of various target addresses at which the data exception is to be taken, lengths of the target addresses, and user callback routines for calling back to the application into a data exception database table.

21. The program product according to claim 20, further comprising:

instruction means for passing, by the data exception handler facility, the data space to the vector of the interrupt table.

22. The program product according to claim 20, wherein the data exception handler further comprises:

instruction means for saving, into a memory stack, data for the request which includes at least the target address for the request, content data relating to the request, and a data address range for the content data;

instruction means for determining whether the target address that is saved into the memory stack is within the database exception database table;

instruction means for immediately terminating the testing of the device driver if the target address is not within the database exception database table;

instruction means for disassembling the data for the request into disassembled information and passing the disassembled information into a respective one of the user callback routines stored in the data exception database table wherein the respective one of the user callback routines that is used is based on the request and is for emulating a behavior of the target device;

instruction means for emulating, by the respective one of the user callback routines, the behavior of the target device;

instruction means for setting a next instruction address to an address in the memory stack that is after the currently saved target address; and instruction means for unwinding the memory stack by the data exception handler to return control back to the application.

23. The program product according to claim 22, further comprising:

instruction means for copying, as necessary, the content data by the respective one of the user callback routines from another data space for the respective one of the user callback routines based on the request.

24. The program product according to claim 20, wherein the data exception handler is a software emulator of the target device and further comprises:

instruction means for using a hardware emulator to test the application for the device driver if the hardware emulator is coupled to the data processing system; and instruction means for using the software emulator to test the application for the device driver if the hardware emulator is not coupled to the data processing system.

25. The program product according to claim 20, further comprising:

instruction means for determining whether the application for the device driver has finished executing;

instruction means for continuing with the executing of the application if the application has not finished executing; and instruction means for terminating the testing of the device driver when the application has finished executing.

26. The method according to claim 1, wherein said data registered in said data exception database table that is used to determine when the data exception is to be taken includes at least one target address at which the data exception is to be taken and at least one user callback routine for calling back to the application.

* * * * *